United States Patent
Ellison

(10) Patent No.: US 9,772,346 B2
(45) Date of Patent: Sep. 26, 2017

(54) AIR DATA SENSOR FOR AN AIRCRAFT

(71) Applicant: BAE SYSTEMS PLC, London (GB)

(72) Inventor: William Frank Ellison, Preston (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 15/030,491

(22) PCT Filed: Oct. 20, 2014

(86) PCT No.: PCT/EP2014/072428
§ 371 (c)(1),
(2) Date: Apr. 19, 2016

(87) PCT Pub. No.: WO2015/059085
PCT Pub. Date: Apr. 30, 2015

(65) Prior Publication Data
US 2016/0266164 A1    Sep. 15, 2016

(30) Foreign Application Priority Data

Oct. 23, 2013   (EP) .................................... 13275253
Oct. 23, 2013   (GB) ................................... 1318753.9

(51) Int. Cl.
*G01P 13/02*   (2006.01)
*B64D 43/02*   (2006.01)
*G01P 5/165*   (2006.01)

(52) U.S. Cl.
CPC ............ *G01P 13/025* (2013.01); *B64D 43/02* (2013.01); *G01P 5/165* (2013.01)

(58) Field of Classification Search
CPC ... G01F 1/708; G01F 1/46; G01F 1/34; G01C 21/00; A63B 53/00

(Continued)

(56) References Cited

U.S. PATENT DOCUMENTS 2,590,521 A     3/1952  Dyche, Jr.
5,220,841 A *   6/1993  Brown ................. A61B 5/0265
                                                  600/504

(Continued)

FOREIGN PATENT DOCUMENTS

EP     0716307 A1    6/1996
EP     1255118 A1    11/2002

(Continued)

OTHER PUBLICATIONS

GB Search Report dated Jan. 30, 2015 of Patent Application No. GB1418575.5 filed Oct. 30, 2014.

(Continued)

*Primary Examiner* — Jewel V Thompson
(74) *Attorney, Agent, or Firm* — Maine Cernota & Rardin

(57) ABSTRACT

Air data sensing apparatus comprising: an aircraft panel; a blister arranged on a surface of the aircraft panel, the blister comprising an upstream portion and a downstream portion, the upstream portion being rounded in three dimensions and having a rounded outer edge surface spaced laterally from the aircraft panel; a plurality of apertures in the surface of the aircraft panel, the apertures being adjacent to the upstream portion of the blister, and spaced from the blister; a plurality of conduits, each conduit being in fluid communication with a respective aperture; and one or more pressure sensors arranged to measure a pressure in each of the conduits.

18 Claims, 2 Drawing Sheets

(58) Field of Classification Search
USPC .............. 73/861.05, 861.42, 861.65, 861.67,
73/170.02, 180
See application file for complete search history.

(56) References Cited

U.S. PATENT DOCUMENTS

| | | | |
|---|---|---|---|
| 6,260,420 B1 * | 7/2001 | Ketelsen | G01F 1/584 73/861.12 |
| 6,550,344 B2 | 4/2003 | Bachinski | |
| 2007/0220992 A1 * | 9/2007 | Lam | G01F 1/58 73/861.15 |
| 2012/0298801 A1 | 11/2012 | Ellison | |
| 2015/0316399 A1 * | 11/2015 | Graf | G01F 1/588 73/861.12 |
| 2016/0202097 A1 * | 7/2016 | Beerling | G01F 1/584 73/861.12 |

FOREIGN PATENT DOCUMENTS

| | | |
|---|---|---|
| GB | 1237540 A | 6/1971 |
| GB | 2491167 A | 11/2012 |

OTHER PUBLICATIONS

GB Search Report dated May 30, 2014 of Patent Application No. GB1318753.9 filed Oct. 23, 2013.
EP Search Report dated Mar. 31, 2014 of Patent Application No. EP13275253.6 filed Oct. 23, 2013.
PCT Search Report dated Dec. 18, 2014 of Patent Application No. PCT/EP2014/072428 filed Oct. 20, 2014.
International Preliminary Report on Patentability of Application PCT/EP2014/072428, dated Apr. 26, 2016, 9 pages.

* cited by examiner

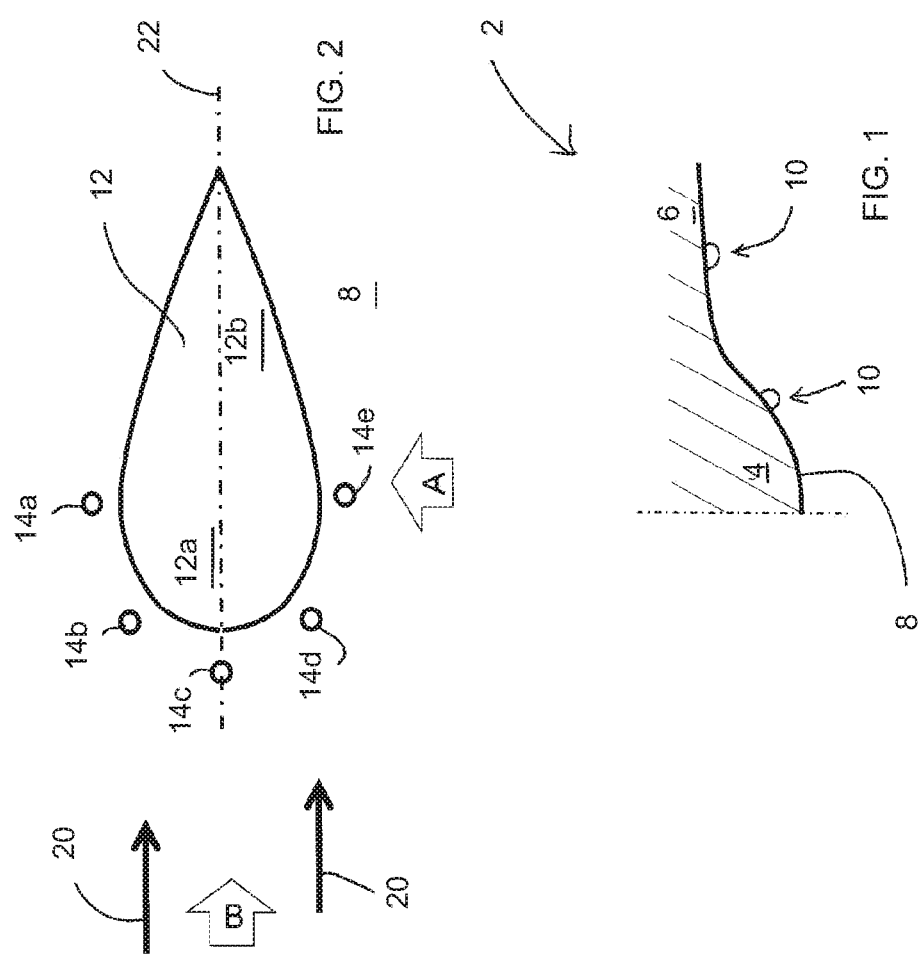

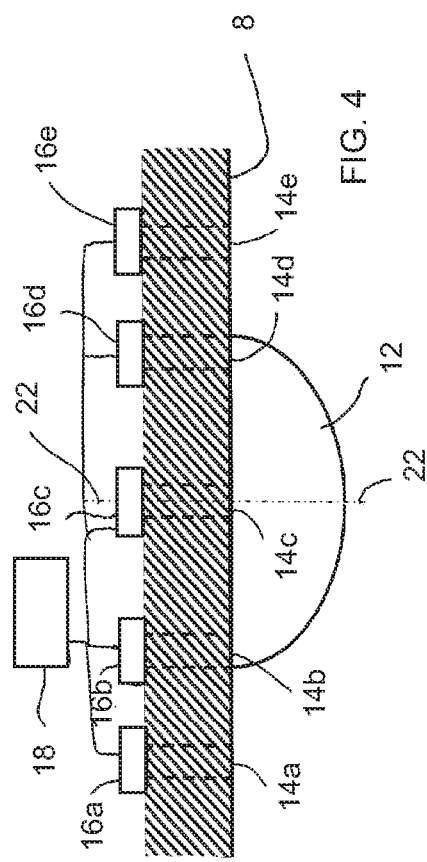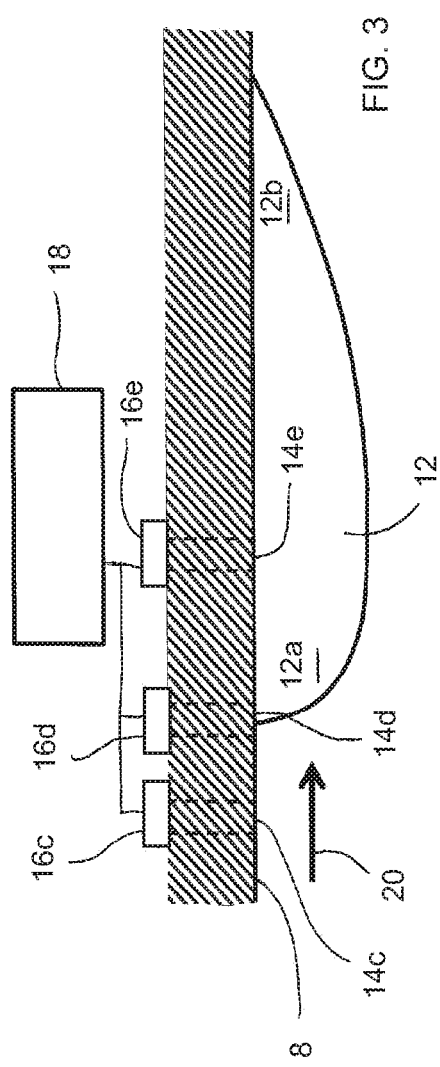

AIR DATA SENSOR FOR AN AIRCRAFT

RELATED APPLICATIONS

This application is a national phase application of PCT Application No. PCT/EP2014/072428 filed on Oct. 20, 2014, which claims priority from Great Britain Application No. GB 1318753.9 filed Oct. 23, 2013 and European Application No. EP 13275253.6 filed Oct. 23, 2013. Each of these applications is herein incorporated in their entirety for all purposes.

The present invention relates to an apparatus for sensing air data, in particular a multi-function air data sensor.

BACKGROUND

An aircraft's air data system measures outside air pressure to provide, for example, airspeed and altitude data to cockpit instruments.

Typically, air data systems use pressure sensors comprising forward (pitot) and side-facing (static) orifices on the surface of the aircraft. These orifices are linked to cockpit gauges, or pressure transducers, via small-diameter pneumatic tubing.

An air data system may also measure angle of attack and sideslip. This may be used to provide stall warning, improved turn coordination, even stability augmentation etc.

Typically, angle of attack and sideslip are measured using airstream direction detectors (e.g. self-aligning vanes).

Alternatively, pressure and flow angle measurement capability may be combined in a single multi-function unit that integrates sensors, transducers, and software, to convert analogue measurements to calibrated digital output data. Multi-function probes may be self-aligning, or fixed designs that derive both pressure and flow angle data purely as a function of local measured absolute and differential pressures.

Generally, accurate, and redundant, air data is important for flight control and operation in controlled airspace. Air data accuracy may be achieved through the "optimal" location of air data sensors on the aircraft so as to minimise aircraft aerodynamic interference effects on air data. Multiple redundant sensors and transducers may be used to achieve reliability.

Typically, air data sensors are mounted on the aircraft forebody. However, achieving optimal locations of multiple sensors (even when multi-function air data probes are used) tends to be difficult due to the competition for space in the nose of the aircraft with other equipment and sensors. Generally, non-optimal air data sensor locations demand more complex correction algorithms and tighter accuracy and repeatability tolerances in order to meet output parameter accuracy requirements.

Also, NASA developed a nose-mounted flush air data sensing (FADS) system. This system comprised an array of pressure tappings, transducers with off-aircraft modelled correction algorithms. Further information on this system can be found in NASA Technical Memorandum 104241, "Development of A Pneumatic High-Angle-of-Attack Flush Airdata Sensing (HI-FADS) System", S. A. Whitmore, November 1991.

NASA has also investigated the feasibility of mounting surface pressure tappings on the wings of an aircraft— potentially using the air data correction algorithms developed for the HI-FADS system. Further information can be found in NASA Technical Memorandum 104267, "Application of a Flush Airdata Sensing System to a Wing Leading Edge", S. A. Whitmore et al. February 1993.

Separately to mounting air pressure sensors on aircraft wings, U.S. Pat. No. 6,550,344 discloses a semi-flush air data sensing probe formed as an elongated bubble housing supported on a support surface. The sensing probe has a generally longitudinally extending rounded outer edge surface with a rounded contoured leading end. A forwardly facing port is provided at the leading end and centred on a central plane. A pair of angle of attack sensing ports is also provided on the leading end, these ports are spaced from one another and are symmetrically located on opposite sides of the central plane.

SUMMARY OF THE INVENTION

In a first aspect, the present invention provides air data sensing apparatus comprising: an aircraft panel; a blister arranged on a surface of the aircraft panel, the blister comprising an upstream portion and a downstream portion, the upstream portion being rounded in three dimensions and having a rounded outer edge surface spaced laterally from the aircraft panel; a plurality of apertures in the surface of the aircraft panel, the apertures being adjacent to the upstream portion of the blister, and being spaced from the blister; a plurality of conduits, each conduit being in fluid communication with a respective aperture; and one or more pressure sensors arranged to measure a pressure in each of the conduits.

The shape of the upstream portion may be that of part of an ellipsoid (e.g. part of a sphere). The downstream portion of the blister may taper from the forward portion to nothing at a distal end. The apertures may be adjacent to the upstream portion of the blister only and not the downstream portion of the blister. There may be at least five apertures. The plurality of apertures may include a central aperture positioned along a centreline of the blister. The plurality of apertures may include an aperture located at or proximate to a lateral extreme of the blister. The apertures may be flush with the surface of the aircraft panel. The blister may be formed integrally with the surface of the aircraft panel. The blister may be formed from the same material as the aircraft panel. The apparatus may further comprise one or more processors configured to receive a signal indicative of the measured pressure from each of the pressure sensors.

In a further aspect, the present invention provides an aircraft comprising air data sensing apparatus in accordance with the above aspect. A centreline of the blister may be substantially parallel to a longitudinal axis of the aircraft.

In a further aspect, the present invention provides a method of sensing air related conditions experienced by an aircraft, the method comprising the steps of: providing a blister on a surface of the aircraft, the blister comprising an upstream portion and a downstream portion, the upstream portion being rounded in three dimensions and having a rounded outer edge surface spaced laterally from the aircraft panel; forming, in the surface of the aircraft adjacent to the upstream portion blister, a plurality of apertures in the surface of the aircraft panel; and, using one or more pressure sensors in fluid communication with the apertures, measuring a pressure within each aperture.

The method may further comprise the step of generating a signal indicative of the pressure in each aperture using a corresponding pressure transducer. The method may further comprise the step of passing the signal from each respective pressure transducer to a central module. The method may further comprise the step of combining the signals to generate air data indicative of the air related conditions experienced by the aircraft. The method may further comprise the step of passing the air data to one of the group of pilot display, ground based monitoring system and flight control system.

BRIEF DESCRIPTION OF THE DRAWINGS

The invention will now be described in greater detail, by way of example only, with reference to the accompanying drawings, in which:

FIG. 1 illustrates a schematic section of part of an aircraft having air data sensor apparatus installed;

FIG. 2 illustrates a schematic plan view of multi-function air data sensor apparatus;

FIG. 3 illustrates a schematic side view (on "A" in FIG. 2) cross-section of multi-function air data sensor apparatus; and FIG. 4 illustrates a schematic end view (on "B" in FIG. 2) cross section of multi-function air data sensor apparatus.

DETAILED DESCRIPTION

A portion of an underside of an aircraft 2 is represented in FIG. 1 having a plurality of multi-function air data sensor assemblies 10 installed thereon. An assembly 10 may be installed on an external surface or skin 8 at a body region 4 of the aircraft 2 and/or it may be mounted on the skin 8 at a wing region 6 of the aircraft. Advantageously, an air data sensor assembly 10 may be shaped to permit installation on any appropriate flat or curved surface of the aircraft body 4 or wings 6.

An embodiment of an air data sensor assembly 10 is shown in greater detail in FIGS. 2 to 4. The assembly comprises an excrescence/protuberance in the form of a blister 12 or bubble. Preferably, the blister 12 is aerodynamically contoured so as to minimise disruption to the bulk flow of air passing over the surface 8 of the aircraft 2 in flight and hence minimise aerodynamic drag. However, the blister 12 is shaped so as to disturb the local air flow 20 to an extent that characteristics of the air flow and the associated pressures in the vicinity of the blister are affected as discussed in detail below. In this embodiment, a forward or upstream portion 12a of the blister 12 is rounded in three dimensions. The forward portion 12a has a rounded outer edge surface spaced laterally from the aircraft surface 8. The forward portion 12a may be part spherical or part ellipsoidal. When viewed from direction B (as shown in FIG. 4), the shape of the front portion 12a in profile is that of part of a hemisphere or hemiellipsoid, i.e. the outer edges of the forward portion is a semicircular or semielliptical in shape. Also, an aft, or downstream portion 12b of the blister tapers, from the forward portion 12a, to nothing at a distal end. In other words, in this embodiment the profile of the blister 12 is substantially tear drop shaped.

In this embodiment, the blister 12 is aerodynamically smooth from a generally part spherical leading end 12a. When viewed from direction A, the forward end 12a of the blister 12 curves outwardly from the aircraft surface 8 along a front edge which smoothly transitions to the aft portion 12b. When viewed from direction A, the shape of the blister 12 is that of a half-teardrop in profile.

The interface between the blister 12 and the skin 8 may be blended or may be discontinuous depending on the required pressure profile, aerodynamic profile and radar cross section profile.

Apertures 14a-e are provided in the skin 8 of the aircraft 2. The apertures 14a-e are proximate or adjacent to, but spaced from, the blister 12. The apertures 14a-e are distributed about the upstream portion 12a of the blister 12 such that local air flow 20, incident on the blister 12 encounters one or more of the apertures 14a-e prior to encountering the blister 12.

Each aperture 14a-e is an inlet port of a pressure sensor and as such is in fluid communication with a pressure transducer 16a-e, e.g., via flexible tubing/ducting. In this embodiment, each inlet port 14a-e is coupled to a respective different pressure transducer, for example, such that absolute pressures may be measured. However, in other embodiments, two or more inlet ports 14a-e are coupled to a common pressure transducer, for example, such that a differential pressure between those inlet ports 14a-e may be determined. The pressure transducers 16a-e convert the received pressure into a corresponding electrical/digital signal. Each pressure transducer 16a-e, in turn, is in communication with a central module 18, configured to receive inputs from the, or each, pressure transducer 16a-e and to analyse the signals in combination. A composite signal is output from the central module 18 and passed to a processor of an air data computer of the aircraft or to customer systems such as one of the group of a pilot display, a ground based monitoring system or other flight control system. Useful air data which can be derived from the received pressure measurements include, but are not limited to, one or more of the group of airspeed, pressure altitude, Mach number, angle of attack, and angle of sideslip. Such inputs, having a high level of accuracy and reliability, are of particular importance to the flight control system of an inherently unstable aircraft.

In this embodiment, the positioning of the apertures is selected to enable differential pressures to be determined and thereby indicate different characteristics of the local incident air flow 20. In this example, five apertures are provided. A central aperture 14c is provided on the centreline 22 of the blister 12, two apertures 14a, 14e are provided adjacent the lateral extremes of the blister 12 and two further apertures 14b, 14d are each provided at an intermediate location between the central aperture and each lateral aperture. It should be noted that whilst five apertures are provided in this embodiment, a different number of apertures, for example three or seven apertures, could be provided. The number of apertures may be selected depending on which air data parameters are to be derived and the particular aircraft surface location of the air data sensor assembly 10. Furthermore, whilst these are represented as being roughly symmetrically distributed about the centreline 22 of the blister 12, this need not be the case, especially if the blister 12 itself is not symmetrical in shape.

In this embodiment, the blister 12 is mounted to the aircraft 2 such that the centreline 22 of the blister 12 is substantially parallel to a longitudinal axis (i.e. a roll axis) of the aircraft 2.

When the incident air flow 20 is substantially parallel to both the aircraft surface 8 and the centreline 22 of the blister 12 (as depicted in FIGS. 2 and 3), a stagnation point on the blister 12 tends to occur at the forward centreline 22 proximate to the aircraft local surface. Away from this stagnation point, surface pressures tend to be lower than the Pitot pressure, and indeed may be lower than ambient (static) pressure. Pressures measured at the central aperture 14c approximate true Pitot pressure as experienced by the blister 12 on the forward centreline 22. Surface pressures measured at intermediate apertures 14b, 14d and lateral apertures 14a, 14c approximate those experienced by the portion of the blister 12 adjacent thereto. Thus, pressures at a surface upon which an incident air flow impinges can be sensed without the need to provide one or more forward facing apertures, for example, an aperture or inlet port located on the blister.

When the air flow 20 is not substantially parallel to the aircraft surface 8, say an angle of incidence of up to 25 degrees from this surface, but remains substantially parallel to the centreline 22 of the blister 12, the distribution of pressures measured by the pressure transducers 16a-e tends to vary in a manner such that local flow angle of attack can be determined by the central module 18. At least the pressure measured at the forward inlet port 14c may reduce as the stagnation point is moved over the surface of the blister 12. The pressures measured at the inlet ports 14a-e tend to represent a significant proportion of true dynamic pressure such that air speed may be determined therefrom.

If the incident flow does not lie on the centreline of the blister 12 but rather approaches from one side, the pressures experienced by apertures 14 on the windward side of the blister 12 will tend to be higher than those on the leeward side of the blister 12. Consequently, lateral air data, such as side slip may be derived.

In combination, the five apertures 14 of this embodiment of the assembly 10 advantageously tend to provide sufficient pressure measurements to enable the central module 18 to determine/derive dynamic pressure, static pressure, angle of attack and sideslip in all flight conditions.

Conventionally, a static pressure sensor is located in a region having as little disruption to the flow field as possible such that perturbations in pressure due to local flow are minimised. In reality, for a sophisticated aircraft there are many restrictions on where sensors may be sited and significant pressure differences from ambient may occur at any permitted location. In some embodiments, it may be necessary to site the sensor assembly 10 such that the geometry of the aircraft (e.g. disturbances initiated by undercarriage movement or control surface deflection) causes irregularities in measured pressures. Such irregularities can be compensated for by using air data schedules or other correction algorithms. In other words, compensation factors may be applied to detected sensor readings to return them to substantially "original" data with deviations which can be attributed to the pressure field currently being experienced by the surface. In so doing, the geometry of the aircraft is thus compensated for.

Such schedules or correction algorithms may be generated by modelling the geometry of the blister and the local aircraft surface to fully characterise and/or nullify the effects of the disturbed local flow field on local pressures. Modelling the geometry of the blister and the local aircraft surface may comprise using, for example, CFD modelling processes, data from a flying test bed, and/or wind tunnel data. Examples of appropriate correction algorithms include, but are not limited to, algorithms that implement neural networks, look-up tables, and/or Bayesian networks.

Whilst a single device is described above, multiple blisters may be provided for redundancy purposes. By providing a complete sensing unit in a single location and then replicating this unit at other locations, rather than relying on a distributed network of ports providing input to a centrally located air data system, the robustness and reliability of the air data system is enhanced in light of potential damage that might be sustained by the aircraft (e.g. due to a bird strike incident).

In conventional air data sensor apparatus at least some orifices are forward facing, either surface mounted or blister mounted. This causes the aircraft to be more detectable, e.g. by a radar system, due to the fixed/regular spacing of the orifices coupled with the orientation of the holes. By providing pressure sensing apertures within the surface of the aircraft but away from the leading edge of the aircraft, not only is the reflectivity of the aircraft, and hence the radar cross section of the aircraft, reduced but the likelihood of the apertures becoming blocked is also reduced.

Preferably, the blister is formed integral with the surface of the aircraft to eliminate any join lines that may be otherwise present with the addition of the blister to the surface.

The pressure sensing is performed on a locally "flat" surface, where, without the blister, pressure differences would tend to be a small proportion of true conditions. The blister advantageously tends to intentionally increase the sensitivity of the measured pressure to airspeed and onset flow angle, thereby facilitating in the calculation of airspeed, altitude, angle of attack and sideslip as a function of these measured pressures. The blister advantageously tends to increase signal to noise ratios compared to if the blister were not present.

In some embodiments, airspeed and direction, angle of attack, and side slide are determined using measurements taken by air data sensor assemblies mounted to or proximate to the aircraft fuselage, i.e. a portion of the aircraft that is relatively rigid and tends to flex or bend only a relatively small amount during flight, whereas Pitot-statics and other parameters may be determined using measurements taken by air data sensor assemblies mounted to or proximate to the aircraft wings, i.e. portions of the aircraft that are relatively flexible and that tends to flex or bend relatively large amounts during flight.

In the above embodiments, the blister comprises a hemispherical or elliptical shaped upstream portion. This blister portion comprises smooth continuous curved surface. The shape of this forward portion advantageously provides an attached flow in the vicinity of the inlet ports. Such a steady flow advantageously tends to provide for repeatable pressure measurements to be taken.

In the above embodiments, the blister comprises a tapered downstream portion. The shape of this aft portion advantageously tends to provide drag reduction. Furthermore, the shape of this portion advantageously tends to delay the transition between the steady attached flow (around the upstream portion of the blister) and the unsteady flow of air away from the blister. Thus, the shape of the aft portion of the blister advantageously tends to provide a larger region of steady flow thereby allowing for more inlet ports to be implemented, greater separation between inlet ports, and/or a smaller sized blister.

In the above embodiments, the inlet ports are located in a locally "flat" aircraft panel as opposed to in a highly curved surface such as on a highly curved blister as disclosed in U.S. Pat. No. 6,550,344. The advantageously tends to facilitate in the testing of the inlet ports and pressure transducers as the flat surface tends to provide that conventional pressure test connectors achieve a good seal to the inlet ports. Inlet ports on some highly curved surfaces may require highly faceted connectors that may have to be bespoke to the surface. Furthermore, the above described "dumb" blister tends to be easier to manufacture than blisters comprising inlet ports such as that disclosed in U.S. Pat. No. 6,550,344.

The invention claimed is:

1. Air data sensing apparatus comprising:
an aircraft panel;

a blister arranged on a surface of the aircraft panel, the blister comprising an upstream portion and a downstream portion, the upstream portion being rounded in three dimensions and having a rounded outer edge surface spaced laterally from the aircraft panel;

a plurality of apertures in the surface of the aircraft panel, the apertures being adjacent to the upstream portion of the blister, and being spaced from the blister;

a plurality of conduits, each conduit being in fluid communication with a respective aperture; and one or more pressure sensors arranged to measure a pressure in each of the conduits.

2. Air data sensing apparatus according to claim 1 wherein the shape of the upstream portion is that of part of an ellipsoid.

3. Air data sensing apparatus according to claim 2 wherein the shape of the upstream portion is that of part of a sphere.

4. Air data sensing apparatus according to claim 1, wherein the downstream portion of the blister tapers from the forward portion to nothing at a distal end.

5. Air data sensing apparatus according to claim 1, wherein the apertures are adjacent to the upstream portion of the blister only and not the downstream portion of the blister.

6. Air data sensing apparatus according to claim 1, wherein there at least five apertures.

7. Air data sensing apparatus according to claim 1, wherein the plurality of apertures includes a central aperture positioned along a centreline of the blister.

8. Air data sensing apparatus according to claim 1, wherein the plurality of apertures includes an aperture located at or proximate to a lateral extreme of the blister.

9. Air data sensing apparatus according to claim 1, wherein the apertures are flush with the surface of the aircraft panel.

10. Air data sensing apparatus according to claim 1, wherein the blister is formed integrally with the surface of the aircraft panel.

11. Air data sensing apparatus according to claim 1, wherein the blister is formed from the same material as the aircraft panel.

12. Air data sensing apparatus according to claim 1, the apparatus further comprising one or more processors configured to receive a signal indicative of the measured pressures from each of the pressure sensors.

13. An aircraft comprising air data sensing apparatus comprising:

an aircraft panel;

a blister arranged on a surface of the aircraft panel, the blister comprising an upstream portion and a downstream portion, the upstream portion being rounded in three dimensions and having a rounded outer edge surface spaced laterally from the aircraft panel;

a plurality of apertures in the surface of the aircraft panel, the apertures being adjacent to the upstream portion of the blister, and being spaced from the blister;

a plurality of conduits, each conduit being in fluid communication with a respective aperture; and one or more pressure sensors arranged to measure a pressure in each of the conduits.

14. An aircraft according to claim 13, wherein a centreline of the blister is substantially parallel to a longitudinal axis of the aircraft.

15. A method of sensing air related conditions experienced by an aircraft, the method comprising the steps of:

providing a blister on a surface of the aircraft, the blister comprising an upstream portion and a downstream portion, the upstream portion being rounded in three dimensions and having a rounded outer edge surface spaced laterally from the aircraft surface; and forming, in the surface of the aircraft adjacent to the upstream portion of the blister, a plurality of apertures said apertures being external to said blister; and using one or more pressure sensors in fluid communication with the apertures, measuring a pressure within each aperture.

16. The air data sensing apparatus of claim 1 wherein said apertures are inlet ports.

17. The aircraft of claim 13 wherein said apertures are inlet ports.

18. The method of claim 15 wherein said apertures are inlet ports.

* * * * *